UNITED STATES PATENT OFFICE.

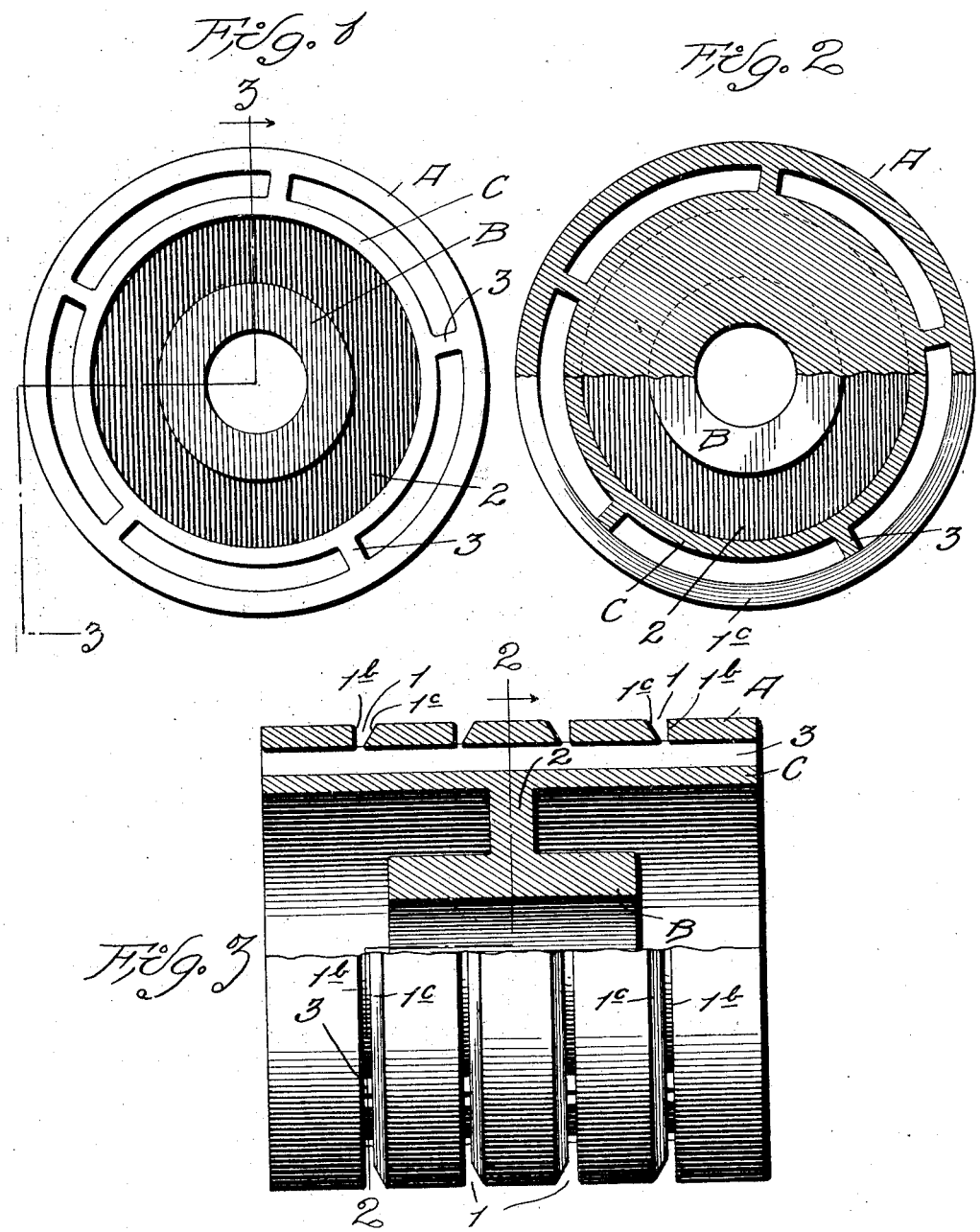

WILLIAM HAMM, OF BELLEVILLE, ILLINOIS.

BELT-PULLEY.

1,356,917.  Specification of Letters Patent.  Patented Oct. 26, 1920.

Application filed February 9, 1920. Serial No. 357,270.

*To all whom it may concern:*

Be it known that I, WILLIAM HAMM, a citizen of the United States, residing at Belleville, Illinois, have invented a certain new and useful Improvement in Belt-Pulleys, of which the following is a full, clear, and exact description, such as will enable others skilled in the art to which it appertains to make and use the same.

This invention relates to belt pulleys of the type in which the rim or belt engaging portion of the pulley is provided with a number of annular slots that extend circumferentially around same so as to prevent an air cushion from forming between the belt and the periphery of the pulley.

One object of my invention is to provide a belt pulley of the general type referred to which is equipped with means for preventing the slots in the periphery of the pulley from becoming clogged by dirt or other material thrown centrifugally from the hub of the pulley, thereby producing a belt pulley that is particularly adapted for use on agricultural machinery and in places where the air is filled with dust or floating particles that collect on the pulley.

Another object is to provide a belt pulley of the general type referred to which is so constructed that the belt will not work laterally in either direction off the periphery of the pulley.

Figure 1 of the drawings is a side elevational view of a belt pulley constructed in accordance with my invention.

Fig. 2 is a vertical transverse sectional view, taken on the line 2—2 of Fig. 3; and Fig. 3 is a front elevational view of the pulley, partly in vertical section, taken on the line 3—3 of Fig. 1.

Referring to the drawings which illustrate the preferred form of my invention, A designates the rim or belt engaging portion of the pulley which is provided with a plurality of annular slots 1 that extend circumferentially around same and B designates the hub of the pulley.

In order to prevent the slots 1 from becoming clogged by material thrown centrifugally from the center of the pulley, I have provided the pulley with an imperforate shield or guard C that is arranged between the rim A and the hub B, as shown in Figs. 1 and 3. The annular space between the shield C and the rim A of the pulley is open at both sides, as shown in Fig. 3, so as to permit the escape of the air which passes inwardly through the slots in the rim. When the pulley is in operation any dust, dirt or other material that is thrown centrifugally from the hub B or from the adjacent portion of the shaft (not shown) to which the hub is connected will be intercepted by the shield C and prevented from entering the slots 1. Consequently, the slots 1 will remain open, and thus prevent a pocket of air from forming between the belt and the rim or belt engaging portion A of the pulley.

The shield C is preferably carried by a web 2 that projects radially from the hub B of the pulley, and the rim A is carried by a plurality of longitudinaly-disposed ribs 3 that are integrally connected to the rim A and to the shield C. By designing the pulley in this manner I can make it easily and at a low cost by casting all of the parts of same in one piece and then cutting the slots 1 in the rim portion A.

In order to prevent the belt from working laterally in either direction off the rim A, I form the slots 1 in such a manner that the slots in one-half of the pulley counteract any tendency of the belt to shift laterally in one direction and the slots in the other half of the pulley counteract any tendency of the belt to shift laterally in the opposite direction. This is accomplished in the pulley herein shown by providing the slots located at the left hand side of the transverse center of the pulley with vertically-disposed outer walls $1^b$ and inner walls $1^c$ that are inclined inwardly toward the center of the pulley and providing the slots at the right hand side of the transverse center of the pulley with vertically-disposed outer walls $1^b$ and inner walls $1^c$ that are inclined oppositely to the inclined walls $1^c$ of the slots in the left hand half of the pulley, as shown in Fig. 3.

A pulley of the construction above described insures the belt remaining in snug engagement with the rim of the pulley; it can be used successfully on agricultural machinery and in places where the atmosphere is filled with dust and floating particles, without liability of the slots in the rim of the pulley becoming clogged, and it is of such design that the belt will remain centered on same and will not work laterally in either direction.

Having thus described my invention, what I claim as new and desire to secure by Letters Patent, is:

1. A belt pulley provided with a rim or belt engaging portion that has a plurality of annular slots which extend circumferentially around same, and an imperforate shield or guard arranged between said rim and the hub of the pulley to intercept any particles that are thrown centrifugally from the center of the pulley, the space between said shield and the rim of the pulley being open at its sides so as to permit the escape of the air which passes inwardly through the slots in the rim.

2. A belt pulley provided with a rim or belt engaging portion that has a plurality of annular slots which extend circumferentially around same, and a shield or guard arranged between said rim and the hub of the pulley to intercept any particles that are thrown centrifugally from the center of the pulley, said slots having inclined side walls which tend to prevent the belt from working laterally in either direction.

3. A belt pulley provided with a rim or belt engaging portion that has a plurality of annular slots that extend circumferentially around same, the slots in the right hand half of the pulley being provided with vertically-disposed outer walls and inner walls that are inclined toward the center of the pulley and the slots in the left hand half of the pulley being provided with vertically-disposed outer walls and inner walls that are inclined oppositely to the inner walls of the slots in the right hand half of the pulley.

4. A belt pulley consisting of a hub provided with a radially-disposed web, an imperforate shield or guard carried by said web, ribs extending longitudinally of said shield, and a rim or belt engaging portion carried by said ribs and provided with annular slots having inclined side walls which tend to prevent the belt from working laterally in either direction.

WILLIAM HAMM.